Aug. 31, 1937.                I. J. FEDJE                 2,091,754
                         SHORTENING CREAMER
                         Filed Dec. 17, 1936
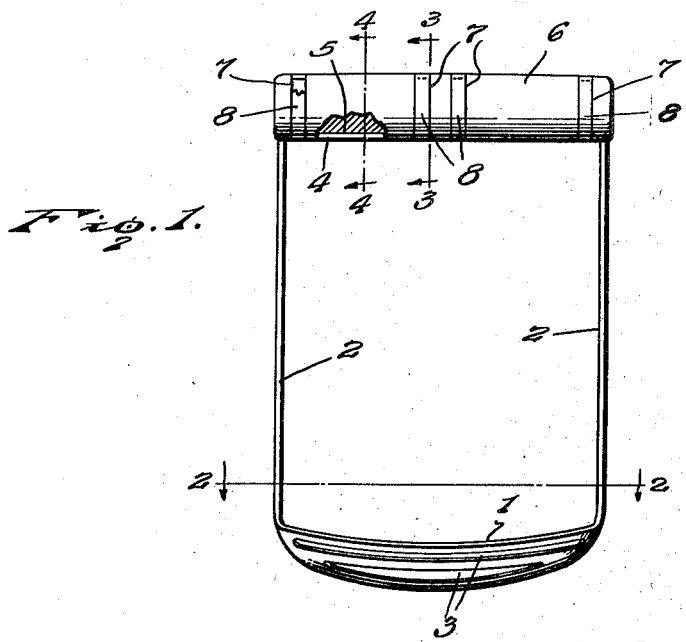
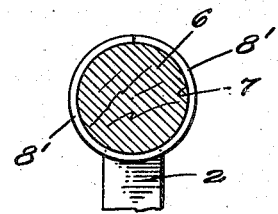
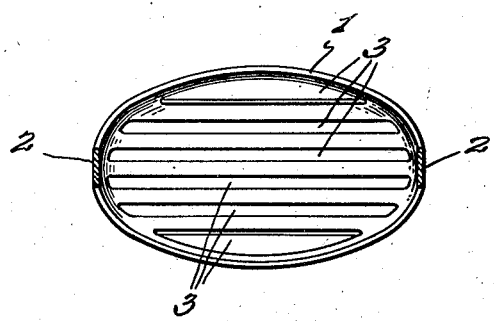
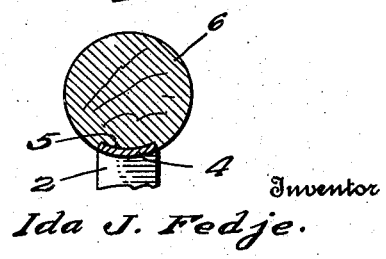
Inventor
Ida J. Fedje.
By Lacy & Lacy, Attorneys Patented Aug. 31, 1937

2,091,754

UNITED STATES PATENT OFFICE 2,091,754

SHORTENING CREAMER

Ida J. Fedje, Berwick, N. Dak.

Application December 17, 1936, Serial No. 116,436

2 Claims. (Cl. 259—144)

This invention relates to a culinary implement and more particularly to a shortening creamer intended for use when mixing butter and sugar together.

When making cake, sugar and butter or other shortening must be thoroughly mixed together to produce a light and creamy mixture. At the present time this operation is carried out by means of a spoon having slots or other openings formed therein but in view of the fact that the spoon has a handle extending from one end thereof and the mixing operation is usually performed in a deep bowl it is difficult to thoroughly mix the butter and sugar without exerting strain upon the wrist due to the angle at which the spoon must be held. Therefore, one object of the invention is to provide a shortening creamer of such construction that it may be very easily held and disposed substantially vertically in the bowl with the material-engaging head of the implement extending horizontally and motion in a vertically disposed substantially circular path imparted to the material-engaging head which will cause the butter and sugar to be easily and quickly intermingled.

Another object of the invention is to provide a shortening creamer wherein the slotted material-engaging head of the implement has arms extending upwardly from its end and firmly connected with a horizontally extending handle disposed in parallel spaced relation to the longitudinal axis of the head so that the hand grasping the handle will be disposed over the material-engaging head instead of beyond one end thereof.

Another object of the invention is to so connect the arms with the handle that the handle will be prevented from having longitudinal movement or rotary movement and thus movement of the arms relative to the handle prevented.

It is another object of the invention to provide a shortening creamer which may be formed from a single blank of sheet metal and thus cheaply manufactured.

The invention is illustrated in the accompanying drawing, wherein

Figure 1 is a view showing the improved shortening creamer in side elevation,

Figure 2 is a sectional view taken on the line 2—2 of Figure 1 and looking down upon the head or bowl of the implement, Figure 3 is a sectional view taken transversely through the handle on the line 3—3 of Figure 1, and Figure 4 is a sectional view taken on the line 4—4 of Figure 1.

The head or bowl 1 of the improved shortening creamer and the arms 2 which extend upwardly from opposite ends thereof are formed from a metal blank, the metal being of sufficient thickness to impart rigidity to the bowl and provide arms of sufficient thickness to prevent them from being bent out of shape when the creamer is in use. The bowl or head 1 is of an oval shape when viewed in top plan, as shown in Figure 2, and is arcuate in both longitudinal and transverse section. Therefore, the bowl or head is of substantially the same shape as the bowl of a spoon but is rounded at both ends instead of tapering to a point at one end. Slots 3 are formed longitudinally in the bowl or head in transverse spaced relation to each other in order that, when the creamer is in use, the sugar and butter or other shortening may pass through these slots and become very thoroughly mixed and result in a soft creamy mixture in a short time.

The arms 2 of the creamer extend straight up from ends of the bowl or head 1 at right angles thereto and have their upper portions bent inwardly toward each other to provide tongues 4 which are disposed at right angles to the arms and are seated in a groove or recess 5 formed longitudinally of the handle 6 in the under portion thereof. Circumferentially extending grooves or recesses 7 are formed in the handle 6 in spaced relation to each other longitudinally thereof and in these recesses 7 are mounted rings or bands 8 formed of tongues or strips 8' extending from opposite sides of the tongues 4. The tongues or arms 4 and the bands 8 have their outer surfaces flush with the surface of the handle and, therefore, the handle may be grasped and firmly held without inconvenience due to engagement of the arms 4 and bands 8 with the hand. The fact that the bands 8 and the arms 4 are countersunk prevents the handle from slipping longitudinally through the bands and also prevents rotary movement of the handle in the bands. Therefore, the arms or standards 2 are held rigid with the handle and prevented from moving about it while creaming the sugar and butter.

Having thus described the invention, what is claimed as new is:

1. A shortening creamer comprising a bowl arcuate longitudinally and transversely and formed with longitudinally extending slots spaced transversely from each other, standards rising from ends of said bowl and having their upper portions bent to provide inwardly extending arms disposed at substantially right angles to said standards, tongues extending from opposite sides of said arms and bent upwardly to form circular bands above the arms, and a handle having its under portion formed with a longitudinally extending recess, the handle being also formed with circumferentially extending recesses intersecting the longitudinal recess and spaced from each other longitudinally of the handle, said arms being seated in the longitudinally extending recess and said bands being seated in the circumferentially extending recesses and the arms or bands having their outer surfaces flush with the surface of the handle.

2. An implement including upright members, arms extending towards each other from said upright members, a handle extending between said upright members and formed with a longitudinally extending recess receiving the arms and also formed with circumferentially extending recesses intersecting the longitudinally extending recess, and bands carried by said arms and engaged about the handle and seated in the circumferentially extending recesses.

IDA J. FEDJE.